(12) United States Patent
Moritz et al.

(10) Patent No.: US 7,735,781 B1
(45) Date of Patent: Jun. 15, 2010

(54) METHOD AND SYSTEM FOR DEPLOYMENT OF ORDNANCE FROM AN AIRCRAFT IN MID-FLIGHT

(75) Inventors: Elan Moritz, Lynn Haven, FL (US); Helmut Portmann, Panama City Beach, FL (US)

(73) Assignee: United States of America as represented by the Secretary of the Navy, Washington, DC (US)

( * ) Notice: Subject to any disclaimer, the term of this patent is extended or adjusted under 35 U.S.C. 154(b) by 1120 days.

(21) Appl. No.: 11/183,148

(22) Filed: Jul. 18, 2005

(51) Int. Cl.
*B64D 1/12* (2006.01)
*B64D 1/06* (2006.01)

(52) U.S. Cl. ............... 244/137.1; 89/1.58; 414/679; 198/371.3

(58) Field of Classification Search ... 244/137.1–137.4, 244/129.4, 129.5, 118.3; 414/137.1, 137.2, 414/137.6, 398; 198/371.3
See application file for complete search history.

(56) References Cited

U.S. PATENT DOCUMENTS

| | | | | |
|---|---|---|---|---|
| 2,388,380 A * | 11/1945 | Bathurst | ............... | 244/118.2 |
| 2,439,423 A * | 4/1948 | Fowler | ............... | 410/79 |
| 2,942,816 A * | 6/1960 | Dostie | ............... | 244/137.2 |
| 3,289,981 A * | 12/1966 | Meyer | ............... | 244/137.2 |
| 3,547,000 A * | 12/1970 | Haberkorn et al. | ............... | 89/1.51 |
| 3,698,480 A * | 10/1972 | Newton | ............... | 169/43 |
| 3,710,917 A * | 1/1973 | Black et al. | ............... | 198/370.09 |
| 3,747,736 A * | 7/1973 | Kornylak | ............... | 198/371.3 |
| 3,792,558 A * | 2/1974 | Berce et al. | ............... | 52/79.7 |
| 4,040,334 A * | 8/1977 | Smethers, Jr. | ............... | 89/1.804 |
| 4,167,258 A * | 9/1979 | Robertson | ............... | 244/129.5 |
| 4,358,182 A * | 11/1982 | Hayes et al. | ............... | 359/737 |
| 4,498,648 A * | 2/1985 | DeLuca et al. | ............... | 244/118.3 |
| 4,981,209 A * | 1/1991 | Sogge | ............... | 198/786 |
| 5,106,038 A * | 4/1992 | Dupont | ............... | 244/137.1 |
| 5,356,097 A * | 10/1994 | Chalupa | ............... | 244/139 |
| 5,816,535 A * | 10/1998 | Underwood et al. | ............... | 244/137.3 |
| 6,070,832 A * | 6/2000 | Redd | ............... | 244/137.3 |
| 6,474,927 B1 * | 11/2002 | McAdams et al. | ............... | 414/340 |
| 6,520,729 B1 * | 2/2003 | Gibson | ............... | 414/679 |
| 6,622,063 B1 * | 9/2003 | Moritz et al. | ............... | 700/231 |
| 6,655,636 B1 * | 12/2003 | Moritz et al. | ............... | 244/137.1 |
| 6,665,582 B1 * | 12/2003 | Moritz et al. | ............... | 700/213 |
| 6,704,618 B1 * | 3/2004 | Moritz et al. | ............... | 700/244 |
| 6,853,875 B1 * | 2/2005 | Moritz et al. | ............... | 700/229 |
| 7,051,979 B2 * | 5/2006 | Howe | ............... | 244/135 R |
| 7,284,727 B2 * | 10/2007 | Nolan | ............... | 244/136 |
| 2005/0017131 A1 * | 1/2005 | Hale et al. | ............... | 244/136 |
| 2005/0072880 A1 * | 4/2005 | Nolan | ............... | 244/136 |

\* cited by examiner

*Primary Examiner*—Michael R Mansen
*Assistant Examiner*—Joshua J Michener
(74) *Attorney, Agent, or Firm*—James T. Shepherd

(57) ABSTRACT

A system for in-air deployment of objects utilizes an aircraft having a hatch that can be opened while the aircraft is in mid-flight. An air and pressure tight container stowed within the aircraft has a doorway that is sealed to and about the hatch from within the aircraft. Mounted within the container is an expulsion system for expelling objects from the container through its doorway and the aircraft's hatch. The container may be coupled and sealed to other containers to define a contiguous volume for storing the objects and allowing movement of the objects between containers.

17 Claims, 4 Drawing Sheets

METHOD AND SYSTEM FOR DEPLOYMENT OF ORDNANCE FROM AN AIRCRAFT IN MID-FLIGHT

ORIGIN OF THE INVENTION

The invention described herein was made in the performance of official duties by a employees of the Department of the Navy and may be manufactured, used, licensed by or for the Government for any governmental purpose without payment of any royalties thereon.

FIELD OF THE INVENTION

The invention relates generally to the in-air deployment of objects, and more particularly to a method and system that provide for the deployment of objects such as ordnance from any conventional (i.e., commercial) aircraft in mid-flight.

BACKGROUND OF THE INVENTION

Currently, military systems, sensors and ordnance are delivered and dispensed by highly specialized and expensive military vehicles (e.g., bombers and fighter aircraft, warships, specialized transport ships, submarines, specialized ground vehicles, etc.). These delivery and dispensing vehicles have been developed to counter high-capability foes that also posses their own high-technology weaponry. However, use of these expensive systems is not cost-effective in all applications. For example, recent events have produced less sophisticated foes that are able to sustain themselves for what may be a long-term conflict. In these types of situations, the expensive high-tech delivery and dispensing vehicles may embody more technology than required. The prolonged use of the sophisticated and specialized systems against relatively unsophisticated foes reduces the useful life of the specialized systems.

SUMMARY OF THE INVENTION

Accordingly, it is an object of the present invention to provide a method and system for in-air deployment of a variety of objects.

Another object of the present invention is to provide a method and system that leverages non-military aircraft for the in-air deployment of objects having a military purpose.

Other objects and advantages of the present invention will become more obvious hereinafter in the specification and drawings.

In accordance with the present invention, a system for in-air deployment of objects utilizes an aircraft having a hatch that can be opened while the aircraft is in mid-flight.

An air and pressure tight container is coupled to and within the aircraft. Specifically, the container has a doorway formed therein with the doorway being sealed about the hatch from within the aircraft. The container is adapted to store objects therein that are to be deployed from the aircraft. Mounted within the container is an expulsion system for expelling the objects from the container through its doorway and the aircraft's hatch when (i) the aircraft is in mid-flight, and (ii) the hatch is opened.

BRIEF DESCRIPTION OF THE DRAWINGS

Other objects, features and advantages of the present invention will become apparent upon reference to the following description of the preferred embodiments and to the drawings, wherein corresponding reference characters indicate corresponding parts throughout the several views of the drawings and wherein.

DETAILED DESCRIPTION OF THE INVENTION

Figure 1:
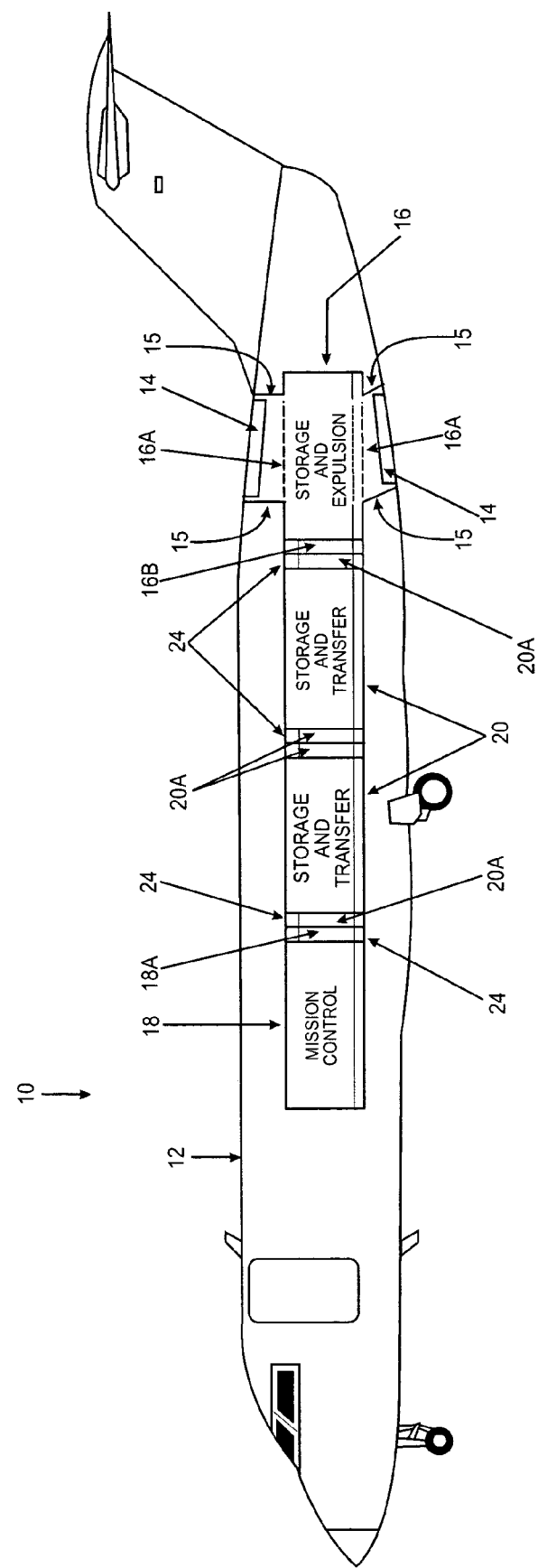
FIG. 1 is a top-level schematic view of a system for in-air deployment of objects in accordance with the present invention.

Referring now to the drawings, and more particularly to FIG. 1, an embodiment of a system that provides for the in-air deployment of objects in accordance with the present invention is shown and is referenced generally by numeral 10.

The present invention contemplates that the objects to be deployed will have some type of military function or purpose. Accordingly, the objects could be, but are not limited to, military systems such as unmanned vehicles, sensors and ordnance.

System 10 includes an aircraft 12 designed or modified to include one or more hatches 14 in the top, bottom and/or sides of aircraft 12. Each of hatches 14 is such that it can be opened/closed while aircraft 12 is in mid-flight. The positioning and size/shape of hatch(es) 14 will be predicated on, for example, the type of aircraft 12, the type of objects that are to be deployed therefrom, the speed and altitude at which aircraft 12 will operate during object deployment, etc.

Accordingly, it is to be understood that the particular design and placement of hatch(es) 14 can vary without departing from the scope of the present invention.

Aircraft 12 can be any military or non-military aircraft capable of handling the requirements associated with a given mission. However, in general, implementation of the present invention will involve the use of commercial passenger and commercial cargo aircraft having one or more hatches 14 incorporated therein. The present invention further contemplates that hatch(es) 14 can be incorporated at any time into aircraft 12 without impacting the commercial use of aircraft 12. Then, in times of emergency, aircraft 12 is immediately ready for military service by incorporation of the "strap in" elements of the present invention described in more detail below.

In general, the "strap in" elements of the present invention include one or more containers fitted within and coupled to aircraft 12 where the containers store objects that are to be deployed through hatch(es) 14 that is Care) opened in mid-flight. At a minimum, a storage and expulsion (S/E) container 16 has an opening or doorway 16A formed therein. While only one such doorway 16A would typically be used, two are illustrated in FIG. 1 owing to the different positions of hatches 14. Doorway 16A is sealed to and completely about hatch 14 from within aircraft 12 by means of an air and pressure tight seal 15. As will be explained further below, S/E container 16 includes a mechanism (not shown in FIG. 1) for actively expelling objects therefrom through opened doorway 16A and opened hatch 14 while aircraft 12 is in mid-flight.

For many applications, additional containers will be provided onboard aircraft 12 in furtherance of its military use. Such additional containers could include a mission control (MC) container 18 and one or more storage and transfer (S/T) containers 20. S/T containers 20 are arrayed within aircraft 12 in an arrangement that could be end-to-end or linear, two-dimensional, or three-dimensional in nature depending on the types/sizes of the containers and aircraft 12. Each of S/T containers 20 stores objects that are to be deployed and contains mechanisms such as controllable floors and/or overhead conveyors for moving objects through the container and for transferring objects to an adjoining container. Accordingly, S/T containers 20 include doors 20A that can be opened so that the interior portions of two adjoining S/T containers 20 (or an S/T container 20 and adjoining S/E container 16 having the same type of door 16B) define a contiguous volume.

Object movement within S/T containers 20 and S/E container 16 as well as movement therebetween, and object expulsion from S/E container 16 through an opened hatch 14, is controlled by a self-contained control system that can be (i) installed in one or more of containers 16 and 20, or (ii) contained within MC container 18 as shown in the illustrated embodiment. In addition, MC container 18 could be used to control the mission of an object (e.g., sensor, unmanned aircraft, ordnance, etc.) once it has been expelled through hatch 14. Accordingly, MC container 18 houses appropriate processing and communication equipment to carry out the above-described control functions as would be understood in the art. For example, MC container 18 could contain control equipment that facilitates one or more of the following: (i) manual control from onboard aircraft 12, (ii) remote control from another aircraft or at a ground/sea facility/vehicle, (iii) preprogrammed control, or (iv) autonomous control. Note that MC container 18 can have doors 18A (same as doors 20A) to provide access to an adjoining container for purposes of, for example, the passage of signal cabling therethrough.

To minimize the impact on the commercial value of aircraft 12 and costs associated with any modification thereto, each of containers 16, 18 and 20 should be both air and pressure tight with adjoining portions (connected through opened doors 16B, 18A and 20A) interfaced and pressure sealed to one another as indicated by interface/seals 24. In this way, only the interior, contiguous volume defined by linked ones of containers 16, 18 and 20 is subject to pressure effects upon the opening of hatch(es) 14 in mid-flight.

Figure 2:
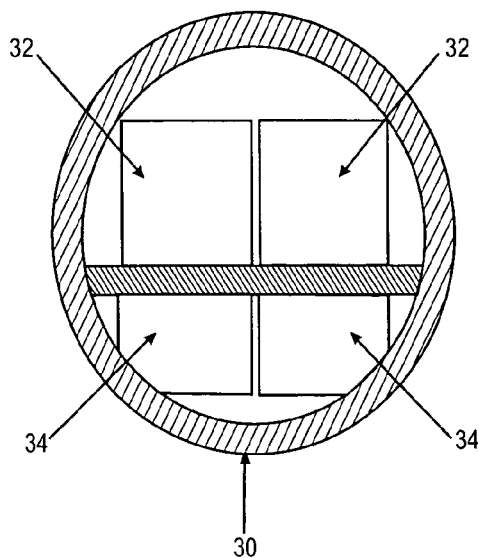
FIG. 2 is a cross-sectional view of an aircraft's fuselage in which both ISO containers and contoured cargo containers are fitted therein.

To further simplify the present invention and to reduce costs, containers 16, 18 and 20 can have their exterior size/shape/configuration be that of a standard container for which aircraft 12 was designed to transport. For example, the containers could be standard ISO containers (e.g., 10, 20 or 40 feet in length) or standard aircraft cargo containers that are contoured to nest within the fuselage of aircraft 12. The present invention could also use both types of containers where space and aircraft strength permits. One such example is illustrated in FIG. 2 where a cross-section of an aircraft fuselage 30 houses a three dimensional array of containers defined by a two-dimensional array of ISO containers 32 arranged above a two-dimensional array of contoured cargo containers 34. Coupling of containers 32 and 34 to adjoining ones thereof would be the same as previously described.

Figure 3:
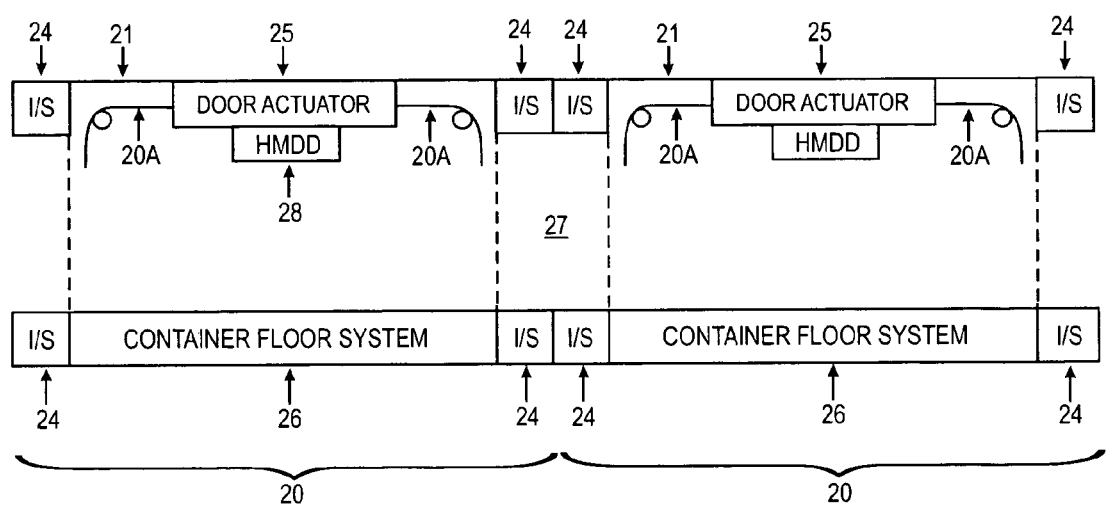
FIG. 3 is a side schematic view of two storage and transfer containers adjoined at sides thereof in accordance with the present invention.

Referring now to FIG. 3, a side schematic view of an embodiment of two S/T containers 20 coupled to one another is shown. It is to be understood that similar coupling arrangements would be used to couple an S/T container 20 to either S/E container 16 or MC container 18. Each of S/T containers 20 is defined by a respective outer structure 21 that is standardized in terms of its size and construction as previously described.

S/T containers 20 are coupled to one another at adjoining sides using an interface/seal (referenced as "I/S" in the drawings) 24 provided about the periphery of the adjoining sides. Each interface/seal 24 can include, but is not limited to the following: (i) specially keyed contact sensors that sense and positively couple to similar or mating contact sensors on the adjoining interface/seal 24, (ii) a sealing mechanism for forming an air and pressure tight seal between two adjoining interface/seals 24, (iii) hydraulic line connections or "pass throughs", (iv) mechanical cable connections or "pass throughs", and (v) power and signal connections for transferring power/signals to systems maintained on each of S/T containers 20.

With S/T containers 20 coupled to one another as just described, doors 20A provided in each of the sides thereof can be opened so that the interior spaces of S/T containers 20 are joined to define a contiguous volume. Doors 20A can be flexible doors that can be pulled up by door actuators 25. Such doors and actuators are well known in the art. It is to be understood that the type of doors and actuators are not limitations of the present invention. For example, the doors could also be sliding doors. Further, each side of S/T containers 20 can be similarly equipped with doors and interface/seals thereby allowing all sides of a container to be coupled to an adjoining container.

Regardless of the door structure, a common passage is defined between S/T containers 20 when doors 20A are opened as shown. This common passage is referenced by area 27 lying between the adjoining openings of S/T containers 20. On either side of common passage 27 is a container floor system 26 which can be mechanized and controlled to move an object placed thereon across the floor in a controllable fashion. Floor systems 26 associated with two adjoining S/T containers 20 are aligned by the coupling of S/T containers 20 to define a substantially contiguous support surface with a small gap defined at common passage 27. Note that the relative size of the gap formed by common passage 27 is exaggerated in the drawings. Each container's floor area defined by its floor system 26 is individually controlled so that an object on floor system 26 can be manipulated in and through one S/T container 20 and then transferred to an adjoining S/T container 20 for manipulation therein and/or therethrough by its floor system 26. Additionally or alternatively, the present invention could utilize other types of material handling systems (e.g., overhead conveyors) to move and transfer objects in and through the containers.

Figure 4:
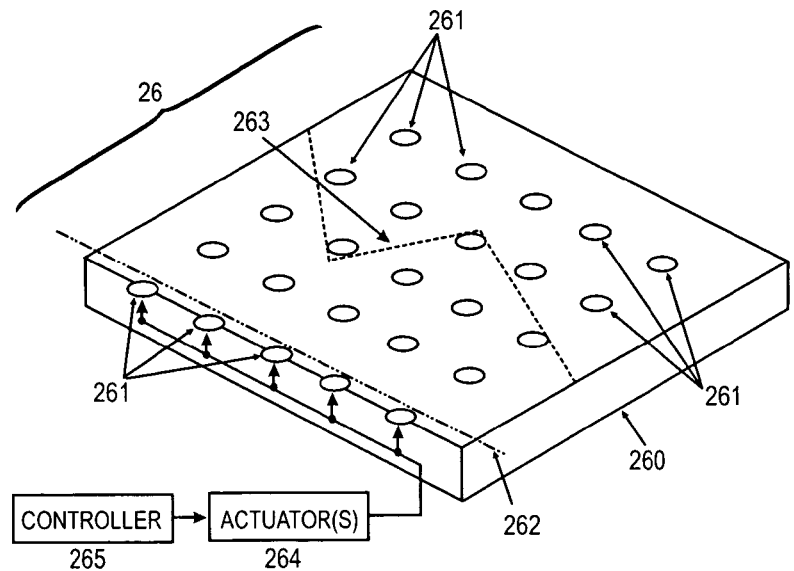
FIG. 4 is a perspective view of an embodiment of a controllable floor for use in the present invention.

Referring additionally to FIG. 4, a preferred embodiment of a floor system (e.g., floor system 26) is illustrated. Floor system 26 has a frame 260 supporting a plurality of wheels 261 arranged in a grid pattern with the tops of wheels 261 defining a planar support surface, an edge of which is depicted by dashed line 262. Each of wheels 261 is a roller-based wheel, a variety of which are known in the art. See, for example, U.S. Pat. Nos. 3,876,255 and 6,340,065, the contents of which are hereby incorporated by reference. Rotation of wheels 261 is controlled such that a path and direction of movement is defined on planar support surface 262. The path could be a straightline path (e.g., perpendicular, parallel or angular in relation to common passage 27) or a shaped path such as a zig-zag path depicted by dashed line 263. The path and its direction of movement can be controlled to manipulate an object (on the path) within S/T container 20 or to and through common passage 27 where control of the floor system in an adjoining container then takes over.

Wheels 261 are controlled individually or in groups thereof by means of actuator(s) 264 coupled thereto. For clarity of illustration, only one row of wheels 261 is shown coupled to actuator(s) 264. Actuators 264 are controlled by a controller 265 that can receive its instructions from signals transferred thereto via signal/power lines entering the container through, for example, one of the container's interface/seals. Another option is for controller 265 to receive its control signals from a wireless transceiver (not shown) located remotely with respect to controller 265. In either case, the control signals could originate in MC container 18. Accordingly, it is to be understood that the way in which controller 265 receives its instructions is not a limitation of the present invention. A system for controlling groups of wheels 261 to produce two-dimensional movement in any direction on planar support surface 262 is disclosed in U.S. Pat. No. 4,981,209, the contents of which are hereby incorporated by reference.

Figure 5:
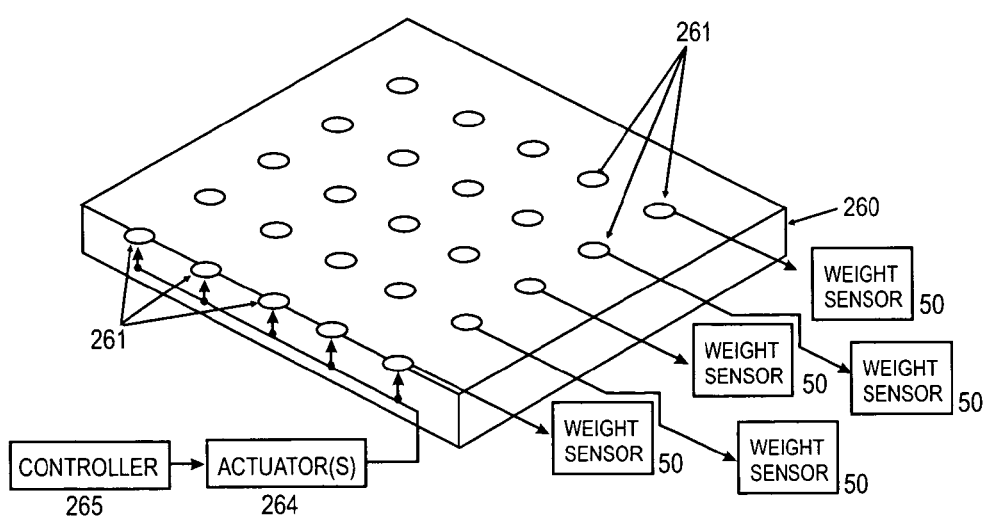
FIG. 5 is a perspective view of the controllable floor in FIG. 4 further equipped with weight sensors.

In applications where the overall weight of the system of the present invention is important, weight of objects moved within, through and expelled from the system, can be tracked. One way of doing this is to equip one or more of the roller-based wheels with weight sensors 50 as shown in FIG. 5 for sensing weight forces of an object moving thereon. Such weight sensors 50 could be positioned at a side door of the container so that each time an object left or entered a container, its weight could be monitored.

The present invention contemplates only the temporary use of commercial aircraft for military purposes with the aircraft then being returned to commercial service. Accordingly, it is important that the military usage of the aircraft does not degrade or compromise the aircraft's commercial uses. For example, when the military purpose involves the deployment of ordnance, it is critical that no hazardous materials associated with such ordnance leak or spill into the aircraft or, at the very least, that such a leak or spill is detected so that a proper clean up can be effected. Thus, each of S/T containers 20 could also be equipped with a hazardous material detection/decontamination system ("HMDD") 28 (FIG. 3) designed to (i) detect the presence of hazardous materials, (ii) provide a signal indicative of such detection that could then be transmitted to MC container 18 for processing thereof, and (iii) provide decontamination processing within the container where possible.

Figure 6:
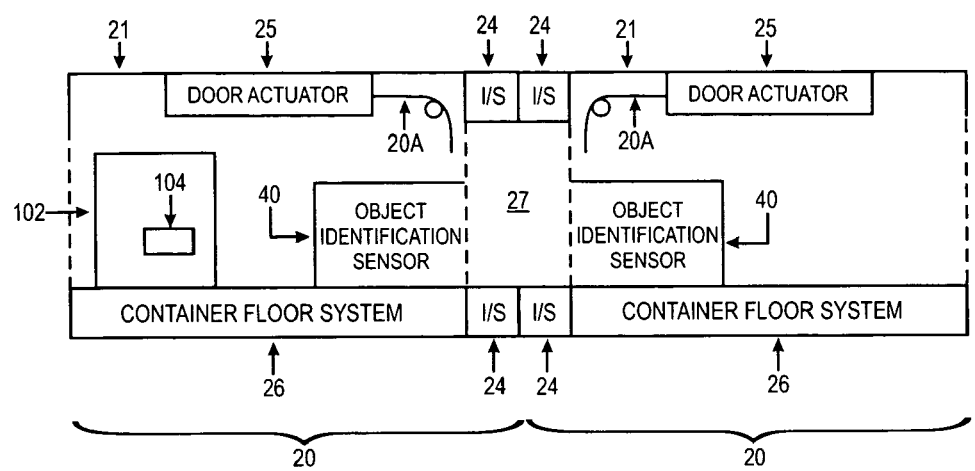
FIG. 6 is a side schematic view of two adjoined containers, each of which is further equipped with object identification sensors.

An object's identity could also be monitored as it moved through the system of the present invention. For example, S/T containers 20 in FIG. 6 have been further equipped with respective sensors (e.g., optical or magnetic readers, bar code readers, etc.) 40 for reading an identifying indicia 104 positioned on an object 102. Sensors 40 would typically be positioned at or near doors 20A to track/record movement of object 102 between S/T containers 20.

Figure 7:
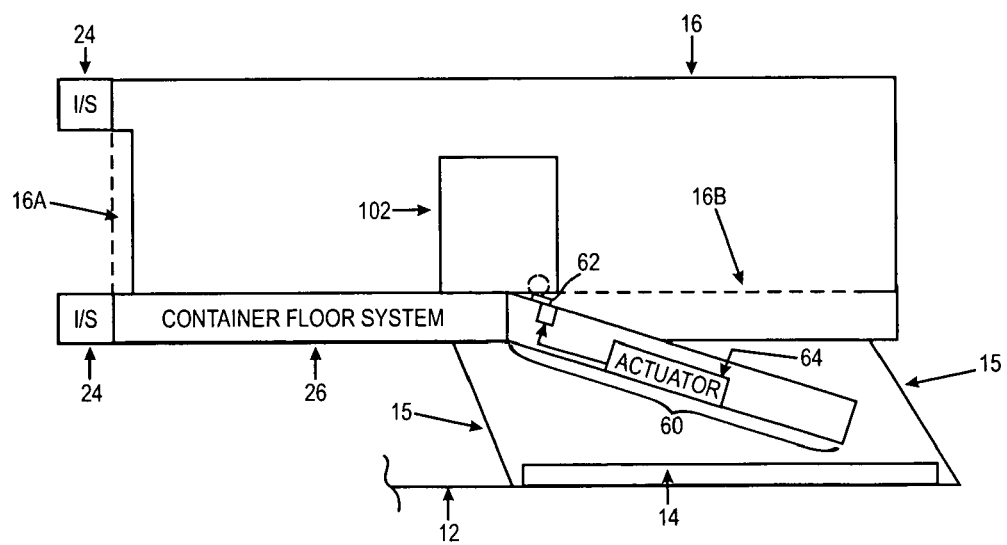
FIG. 7 is a side schematic view of a storage and expulsion container in accordance with the present invention.

As mentioned above, expulsion of objects from aircraft 12 is handled by S/E container 16 that is sealed to and about hatch 14. By way of example, FIG. 7 illustrates an embodiment of S/E container 16 for expelling objects through an opened hatch 14. In FIG. 7, container floor system 26 terminates part way into S/E container 16 where a mechanized ramp assembly 60 is coupled thereto. Ramp assembly 60 includes a positive engagement device 62 (e.g., hook, clamp, electromagnet, etc.) that can engage object 102 as it is positioned at the leading edge of ramp assembly 60. An actuator 64 (e.g., pneumatic, hydraulic, etc.) is coupled to device 62 to extract object 102 from container floor system 26 and propel same down ramp assembly 60. Once reaching the outboard end of ramp assembly 60, engagement device 62 releases from object 102 and the impulse power supplied by actuator 64 causes object 102 to be expelled through hatch 14 and safely away from aircraft 12 which is in mid-flight. The particular design of ramp assembly 60 is not a limitation of the present invention. Furthermore, the present invention is not limited to the use of an ejection ramp assembly to expel objects through an opened hatch 14 as any suitable expulsion system could be employed.

The advantages of the present invention are numerous. The simple and efficient method and system allow commercial aircraft to be leveraged for military use. The invention only requires one modification to a commercial aircraft as the remaining elements are modular in nature. In addition, the added elements form a "strap in" system that is completely self-contained and does not require anything to be attached to the aircraft's exterior. Thus, the aircraft's operation and aerodynamics are only minimally impacted. Further, once military needs are met, the aircraft can be immediately returned to commercial service.

Although the invention has been described relative to a specific embodiment thereof, there are numerous variations and modifications that will be readily apparent to those skilled in the art in light of the above teachings. It is therefore to be understood that, within the scope of the appended claims, the invention may be practiced other than as specifically described.

What is claimed as new and desired to be secured by Letters Patent of the United States is:

1. A system for in-air deployment and control of objects, comprising:
   an aircraft having a hatch that can be opened while said aircraft is in mid-flight;
   an air and pressure tight separable container coupled to and within said aircraft, said container having a doorway formed therein with said doorway being sealed about said hatch from within said aircraft, said container adapted to store objects therein that are to be deployed from said aircraft; and
   means, mounted within said container, for expelling the objects from said container through said doorway and said hatch when (i) said aircraft is in mid-flight, and (ii) said hatch is opened; and
   a controller coupled to said means for expelling, said controller controlling (i) expulsion of the objects from said aircraft, and (ii) operation of the objects after expulsion of the objects.

2. A system as in claim 1 wherein the objects are ordnance, and wherein said aircraft is a non-military aircraft.

3. A system as in claim 2 further comprising means mounted in and coupled to said container for preventing contamination of said aircraft from hazardous materials originating from the ordnance.

4. A system as in claim 1 wherein said container is selected from the group consisting of a standardized International Organization for Standardization (ISO) container and a standardized aircraft cargo container.

5. A system for in-air deployment and control of ordnance, comprising:
   an aircraft having a hatch that can be opened while said aircraft is in mid-flight;
   a plurality of air and pressure tight containers coupled to an inner portion of said aircraft and arranged in an array therein, each of said containers having a floor defined by a planar arrangement of roller-based wheels capable of rotational movement, each of said containers having at least one side thereof adjoining, coupled and sealed to a side of another of said containers wherein two adjoining sides are thereby defined, each of said two adjoining sides including a door that opens to define a common passage through said two adjoining sides, wherein said floor adjacent one of said two adjoining sides is aligned with said floor adjacent the other of said two adjoining sides to define a substantially contiguous support surface therebetween, and wherein interior spaces associated with two of said containers so adjoined, coupled and sealed to one another define a contiguous volume;

means coupled to said roller-based wheels in each of said containers for generating selective rotation of said roller-based wheels to define a path and direction of movement along said floor, wherein ordnance placed on said path will travel therealong in said direction of movement, and wherein said path in one of said containers changes to said path in an adjoining one of said containers at said common passage defined therebetween;

one of said containers in said array being a dispensing container, said dispensing container having a doorway formed therein and sealed about said hatch from within said aircraft, said dispensing container adapted to receive and store ordnance therein that are to be deployed from said aircraft;

means, mounted within said dispensing container, for expelling ordnance from said dispensing container through said doorway and said hatch when (i) said aircraft is in mid-flight, and (ii) said hatch is opened; and a controller mounted in one of said containers and coupled to said means for expelling, said controller controlling (i) expulsion of the ordnance from said aircraft, and (ii) operation of the ordnance after expulsion of the ordnance.

6. A system as in claim 5 wherein said aircraft is a non-military aircraft.

7. A system as in claim 6 further comprising means mounted in and coupled to each of said containers for preventing contamination of said aircraft from hazardous materials originating from the ordnance.

8. A system as in claim 5 wherein each of said containers is selected from the group consisting of a standardized International Organization for Standardization (ISO) container and a standardized aircraft cargo container.

9. A system as in claim 5 further comprising, for each of said containers, a sensor coupled to at least one of said roller-based wheels for sensing a weight force acting thereon.

10. A system as in claim 5 further comprising means, mounted in each of said containers, for sensing identifying indicia on the objects traveling on said path.

11. A system as in claim 5 wherein said array is one of a linear array, a two-dimensional array, and a three-dimensional array.

12. A system for in-air deployment and control of ordnance, comprising:

an aircraft having a hatch that can be opened while said aircraft is in mid-flight;

a plurality of air and pressure tight containers coupled to an inner portion of said aircraft and arranged in an array therein, each of said containers having at least one side thereof adjoining, coupled and sealed to a side of another of said containers wherein two adjoining sides are thereby defined, each of said two adjoining sides including a door that opens to define a common passage through said two adjoining sides, wherein interior spaces associated with two of said containers so adjoined, coupled and sealed to one another define a contiguous volume;

each of said containers including a controllable handling mechanism for moving ordnance in a controlled manner, wherein the ordnance can be (i) manipulated within a respective one of said containers, and (ii) transferred to another of said containers adjoined thereto via said common passage defined therebetween;

one of said containers in said array being a dispensing container, said dispensing container having a doorway formed therein and sealed about said hatch from within said aircraft, said dispensing container adapted to receive and store ordnance therein that are to be deployed from said aircraft;

means, mounted within said dispensing container, for expelling ordnance from said dispensing container through said doorway and said hatch when (i) said aircraft is in mid-flight, and (ii) said hatch is opened; and a controller mounted in one of said containers and coupled to said means for expelling, said controller controlling (i) expulsion of the ordnance from said aircraft, and (ii) operation of the ordnance after expulsion of the ordnance.

13. A system as in claim 12 wherein said aircraft is a non-military aircraft.

14. A system as in claim 13 further comprising means mounted in and coupled to each of said containers for preventing contamination of said aircraft from hazardous materials originating from the ordnance.

15. A system as in claim 12 wherein each of said containers is selected from the group consisting of a standardized International Organization for Standardization (ISO) container and a standardized aircraft baggage container.

16. A system as in claim 12 wherein said array is one of a linear array, a two-dimensional array, and a three-dimensional array.

17. A method of in-air deployment of ordnance, comprising the steps of:

providing a non-military aircraft;

modifying the aircraft by installing a hatch in said aircraft that can be opened while said aircraft is in mid-flight;

coupling an air and pressure tight container to and within said aircraft, said container having a doorway formed therein and having means for expelling objects stored therein through said doorway;

sealing said doorway about said hatch from within said aircraft;

providing ordnance in said container;

providing a controller coupled to said means for expelling, said controller controlling (i) expulsion of the objects from said aircraft, and (ii) operation of the objects after expulsion of the objects; and expelling the ordnance from said container through said doorway and said hatch when (i) said aircraft is in mid-flight, and (ii) said hatch is opened.

* * * * *